US012374213B2

(12) United States Patent
Luo

(10) Patent No.: US 12,374,213 B2
(45) Date of Patent: Jul. 29, 2025

(54) SIGNAL TRANSMISSION CIRCUIT AND ELECTRONIC DEVICE

(71) Applicant: Shanghai Yaohuo Microelectronics Co., Ltd., Shanghai (CN)

(72) Inventor: Yongjin Luo, Shanghai (CN)

(73) Assignee: Shanghai Yaohuo Microelectronics Co., Ltd., Shanghai (CN)

( * ) Notice: Subject to any disclaimer, the term of this patent is extended or adjusted under 35 U.S.C. 154(b) by 626 days.

(21) Appl. No.: 17/711,041

(22) Filed: Apr. 1, 2022

(65) Prior Publication Data

US 2023/0021032 A1 Jan. 19, 2023

(30) Foreign Application Priority Data

Jul. 16, 2021 (CN) ......................... 202110804230.3

(51) Int. Cl.
*G08C 19/10* (2006.01)
*G08C 13/00* (2006.01)

(52) U.S. Cl.
CPC ............. *G08C 19/10* (2013.01); *G08C 13/00* (2013.01)

(58) Field of Classification Search
CPC ...... H03K 17/687; H04B 1/006; H04B 1/406; H04B 1/525; H02J 9/005; H02J 7/32; Y02B 70/30; Y04S 20/20; G08C 19/10; G08C 13/00; G08C 19/00; G08C 19/02; H04Q 9/00
See application file for complete search history.

(56) References Cited

U.S. PATENT DOCUMENTS

| | | | | |
|---|---|---|---|---|
| 7,263,337 B2 * | 8/2007 | Struble | H03K 17/693 | 333/101 |
| 7,468,723 B1 * | 12/2008 | Collins | H05B 45/38 | 345/82 |
| 8,159,282 B2 * | 4/2012 | Katoh | H03K 17/693 | 327/434 |
| 9,667,244 B1 * | 5/2017 | Cavus | H03K 17/145 | |
| 9,712,158 B1 * | 7/2017 | Cavus | H03K 17/687 | |
| 10,659,031 B2 * | 5/2020 | Franck | H03K 17/04106 | |
| 11,901,887 B2 * | 2/2024 | Wakazono | H03K 17/063 | |
| 2004/0229577 A1 * | 11/2004 | Struble | H03K 17/693 | 455/127.1 |

(Continued)

FOREIGN PATENT DOCUMENTS

CN 110278096 A 9/2019

*Primary Examiner* — Jinsong Hu
*Assistant Examiner* — Rui M Hu
(74) *Attorney, Agent, or Firm* — Zhu Lehnhoff LLP

(57) ABSTRACT

A signal transmission circuit includes N signal transmission paths, a boost control module and a first feedback module; the signal transmission path includes two signal transmission terminals and a path switch connected between the two signal transmission terminals; the first feedback module is configured to feed back a voltage to be superimposed to the boost control module, the voltage to be superimposed is matched to the maximum voltage among voltages of the M signal transmission terminals; the boost control module is configured to boost the input voltage and output a target signal through a third terminal of the boost control module to drive the path switch into a first state by using the target signal when the input voltage is at a high level, where a voltage of the target signal is adapted to the sum of a boosted voltage of the input voltage and the voltage to be superimposed.

16 Claims, 6 Drawing Sheets

(56) References Cited

U.S. PATENT DOCUMENTS

| | | | | |
|---|---|---|---|---|
| 2004/0251952 | A1* | 12/2004 | Nakatsuka | H03K 17/102<br>327/430 |
| 2007/0029883 | A1* | 2/2007 | Yoshida | H02J 7/32<br>307/125 |
| 2007/0049352 | A1* | 3/2007 | Nakajima | H04B 1/006<br>455/571 |
| 2007/0085592 | A1* | 4/2007 | Yasuda | H03K 17/693<br>327/430 |
| 2010/0069020 | A1* | 3/2010 | Koya | H03K 17/687<br>327/306 |
| 2010/0117713 | A1* | 5/2010 | Katoh | H03K 17/063<br>327/427 |
| 2011/0254614 | A1* | 10/2011 | Huang | H03K 17/063<br>327/534 |
| 2012/0200335 | A1* | 8/2012 | Koya | H04B 1/006<br>327/505 |
| 2013/0069708 | A1* | 3/2013 | Koya | H04B 1/406<br>327/427 |
| 2015/0042298 | A1* | 2/2015 | Kung | H02M 3/1588<br>323/271 |
| 2015/0108836 | A1* | 4/2015 | Hsu | H02M 3/155<br>307/24 |
| 2015/0280429 | A1* | 10/2015 | Makita | H02H 9/04<br>361/86 |
| 2018/0108988 | A1* | 4/2018 | Liu | H04B 1/00 |
| 2019/0296726 | A1* | 9/2019 | Kolcuoglu | H03K 17/0406 |
| 2020/0112300 | A1* | 4/2020 | Balteanu | H03K 3/356113 |
| 2022/0203090 | A1* | 6/2022 | Chen | A61N 1/3614 |

* cited by examiner

SIGNAL TRANSMISSION CIRCUIT AND ELECTRONIC DEVICE

CROSS REFERENCE TO THE RELATED APPLICATIONS

This application is based upon and claims priority to Chinese Patent Application No. 202110804230.3 filed on Jul. 16, 2021, the entire contents of which are incorporated herein by reference.

TECHNICAL FIELD

The present invention relates to the field of signal transmission, and in particular, to a signal transmission circuit and an electronic device.

BACKGROUND

In an electronic device, signal transmission can be implemented by using a signal transmission circuit including one or more signal transmission paths. When a voltage amplitude of a signal transmitted over the signal transmission path is much greater than a voltage amplitude of a power supply for a circuit structure, supply voltages tend to be boosted.

In the prior art, a charge pump with ultra boost multiple is usually used to generate a high voltage, and in some solutions, a resistor is required to reduce the high voltage, and then a signal after voltage reduction is used to control a path switch in a signal transmission path to enter a state (for example, control the path switch to turn on), and the charge pump with ultra boost multiple (and another device such as a resistor working with the charge pump) will lead to problems such as larger circuit area, higher costs and higher power consumption.

In addition, another control signal is required to control the path switch to enter another state (for example, control the path switch to turn off). Therefore, the two control signals will increase pins, resulting in larger area and higher costs.

SUMMARY

The present invention provides a signal transmission circuit and an electronic device to solve the problems of large circuit area and high costs.

According to a first aspect, the present invention provides a signal transmission circuit, including N signal transmission paths; the signal transmission path includes two signal transmission terminals and a path switch connected between the two signal transmission terminals, where N≥1;

- the signal transmission circuit further includes a boost control module and a first feedback module;
- a first terminal of the boost control module is connected to an input voltage, a second terminal of the boost control module is connected to the first feedback module, and a third terminal of the boost control module is directly or indirectly connected to a control terminal of the path switch; and the first feedback module is connected to M signal transmission terminals, where M≤2N;
- the first feedback module is configured to feed back a voltage to be superimposed to the boost control module, and the voltage to be superimposed is adapted to the maximum voltage among voltages of the M signal transmission terminals;

- the boost control module is configured to boost the input voltage and output a target signal through a third terminal of the boost control module to drive the path switch into a first state by using the target signal when the input voltage is at a high level, where a voltage of the target signal is matched to the sum of a boosted voltage of the input voltage and the voltage to be superimposed, and the first state is an on state or an off state.

Optionally, the maximum voltage is higher than the voltage to be superimposed, and the difference between the maximum voltage and the voltage to be superimposed is a fixed value.

Optionally, the first feedback module includes M diodes and a feedback capacitor;

- an anode of each diode is connected to a corresponding signal transmission terminal, cathodes of the M diodes are short circuited together and then connected to a first terminal of the feedback capacitor, the first terminal of the feedback capacitor is connected to the second terminal of the boost control module, and a second terminal of the feedback capacitor is grounded.

Optionally, the signal transmission circuit further includes a driver module including N first drive switches;

- a first terminal of the first drive switch is connected to the third terminal of the boost control module, a second terminal of the first drive switch is connected to a path switch in a corresponding signal transmission path, and each first drive switch is kept on and current is matched;
- the control terminal of the path switch is connected with a path capacitor; when the first drive switch is turned on, the path capacitor can be charged by current from the first drive switch.

Optionally, the driver module further includes a current source and a reference drive switch;

- a first terminal of the reference drive switch is connected to the third terminal of the boost control module, a second terminal of the reference drive switch is grounded through the current source, a control terminal of the reference drive switch is connected with a control terminal of each first drive switch, and current of each first drive switch is matched to current of the reference drive switch.

Optionally, the driver module includes N second drive switches;

- a first terminal of the second drive switch is connected to a control terminal of a path switch in a corresponding signal transmission path, and a second terminal of the second drive switch is grounded;
- the second drive switch is configured to turn on when the input voltage is at a low level to drive a path switch in a corresponding signal transmission path into a second state;
- if the first state is an on state, the second state is an off state; and
- if the first state is an off state, the second state is an on state.

Optionally, the signal transmission circuit further includes a pull-down control module;

- a first terminal of the pull-down control module is connected to the input voltage, and a second terminal of the pull-down control module is connected to a control terminal of the second drive switch;
- the pull-down control module is configured to:
- control the second drive switch to turn on when the input voltage is at a low level.

Optionally, a third terminal of the pull-down control module is connected to a reference voltage; the reference voltage is matched to the maximum voltage, and the reference voltage is derived from the first feedback module or another second feedback module;

the pull-down control module is specifically configured to:

drive the second drive switch to turn on when the reference voltage is in a specified operating voltage range and the input voltage is at a low level.

Optionally, the reference voltage is lower than the voltage to be superimposed and also lower than the maximum voltage.

According to a second aspect, the present invention provides an electronic device, including the signal transmission circuit according to the first aspect and optional solutions thereof.

In the signal transmission circuit and the electronic device provided in the present invention, the boost control module superimposes a voltage to be superimposed on the basis of the boosted voltage of the input voltage. Because the voltage to be superimposed is matched to the maximum voltage among voltages of the signal transmission terminals, voltages output by the boost control module can accurately and fully meet the driving requirements of the path switch when the input voltage is at a high level (for example, meet the requirements of source-drain gate threshold voltage), which avoids the need to use a charge pump for boosting several times for boosting (further, a resistor may be used to reduce voltage), thereby effectively reducing circuit area, costs and power consumption.

In optional solutions of the present invention, due to arrangement of the second drive switch and the pull-down control module, the pull-down control module can control pull-down of the second drive switch based on the input voltage, so as to effectively control the path switch when the input voltage is at a low level. Obviously, in the optional solutions of the present invention, on-off control of the path switch can be achieved based on the same input voltage without inputting different control signals respectively for the circuit, and on this basis, the number of pins can be reduced, thereby further reducing circuit area and costs.

BRIEF DESCRIPTION OF THE DRAWINGS

In order to explain the technical solutions in the embodiments of the present invention or in the prior art more clearly, the drawings used in the description of the embodiments or the prior art will be briefly introduced below. Obviously, the drawings in the following description are merely some embodiments of the present invention. For those of ordinary skill in the art, other drawings can be obtained based on these drawings without creative efforts.

Figure 1:
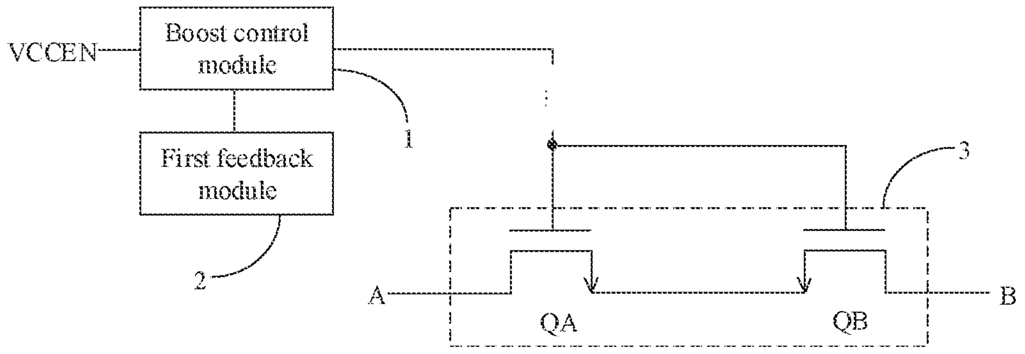
FIG. 1 is a schematic diagram I of a structure of a signal transmission circuit according to an embodiment of the present invention.

Description of reference signs in the drawings:

1—boost control module;
2—first feedback module;
3—signal transmission path;
4—driver module;
41—current source;
5—pull-down control module;
6—second feedback module;
Q0—reference drive switch;
Q1—first drive switch;
Q2—second drive switch;
QA, QB—path switches;
Cgs—path capacitor;
D1—first capacitor;
D2—second capacitor;
C0—first feedback capacitor;
Cx—second feedback capacitor;
Rx—feedback resistor;
Zx—Zener diode.

DETAILED DESCRIPTION OF EMBODIMENTS

The following clearly and completely describes the technical solutions in the embodiments of the present invention with reference to the accompanying drawings in the embodiments of the present invention. Obviously, the described embodiments are merely some but not all of embodiments of the present invention. Based on the embodiments of the present invention, all other embodiments obtained by those of ordinary skill in the art without creative efforts should fall within the protection scope of the present invention.

In the description of the specification of the present invention, it should be understood that an orientation or positional relationship indicated by the terms "upper", "lower", "upper end", "lower end", "lower surface", "upper surface" and the like is an orientation or positional relationship shown based on the accompanying drawings, is intended only to facilitate the description of the present invention and simplification of the description rather than indicating or implying that a device or element referred to must have a specific orientation, or be constructed and operated in a specific orientation, and therefore should not be construed as a limitation to the present invention.

In the description of the specification of the present invention, the terms "first" and "second" are used for descriptive purposes only and are not to be construed as indicating or implying a relative importance or implicitly indicating the number of technical features indicated. Thus, features limited by the terms "first" or "second" may include one or more of the features either explicitly or implicitly.

In the description of the present invention, "a plurality of" means at least two, such as two, three and four, unless otherwise specifically specified.

In the description of the specification of the present invention, unless otherwise specified and defined, the terms "connection" and the like should be understood in a broad sense, which, for example, may be understood as fixed connection, detachable connection or integral connection; may be understood as mechanical connection, electrical connection or communication with each other; or may be understood as direct connection, indirect connection via an intermediate medium, or communication between the interiors of two elements or interactions between two elements. The specific meanings of the above terms in the present invention can be understood in specific cases by those of ordinary skill in the art.

The technical solutions of the present invention will be described in detail with reference to specific embodiments below. The following specific embodiments may be combined with each other, and details of the same or similar concepts or processes may not be repeated in some embodiments.

Referring to FIG. 1 to FIG. 6, an embodiment of the present invention provides a signal transmission circuit including N signal transmission paths 3, where N≥1; that is, the number of the signal transmission paths 3 is at least one, and in the following text, N can also be characterized by n.

The signal transmission path includes two signal transmission terminals and a path switch connected between the two signal transmission terminals; the two signal transmission terminals of each signal transmission path can be characterized as a terminal A and a terminal B. Furthermore, when more signal transmission paths are provided, a terminal A1, a terminal A2, a terminal An, a terminal B1, a terminal B2 and a terminal Bn can also be used to characterize the signal transmission terminals. The number of path switches in a signal transmission path can be one or more. When the number of path switches in the signal transmission terminals is two, the terminal A, a first terminal of a path switch QA, a second terminal of a path switch QA, a first terminal of a path switch QB, a second terminal of a path switch QB, and the terminal B are connected in sequence.

In an illustrated example, the path switch can be an NMOS transistor, and thus, the path switch can be turned on when a control terminal inputs a high level, and the path switch can be turned off when the control terminal inputs a low level. In this case, a drain of the path switch QA is connected to (or used as) a signal transmission terminal (i.e., the terminal A), a drain of the path switch QB is connected to (or used as) a signal transmission terminal (i.e., the terminal B), and a source of the path switch QA is connected to a source of the path switch QB. In another example, the path switch can also be a PMOS transistor, a triode, any other transistor or any other electronic device.

Figure 6:
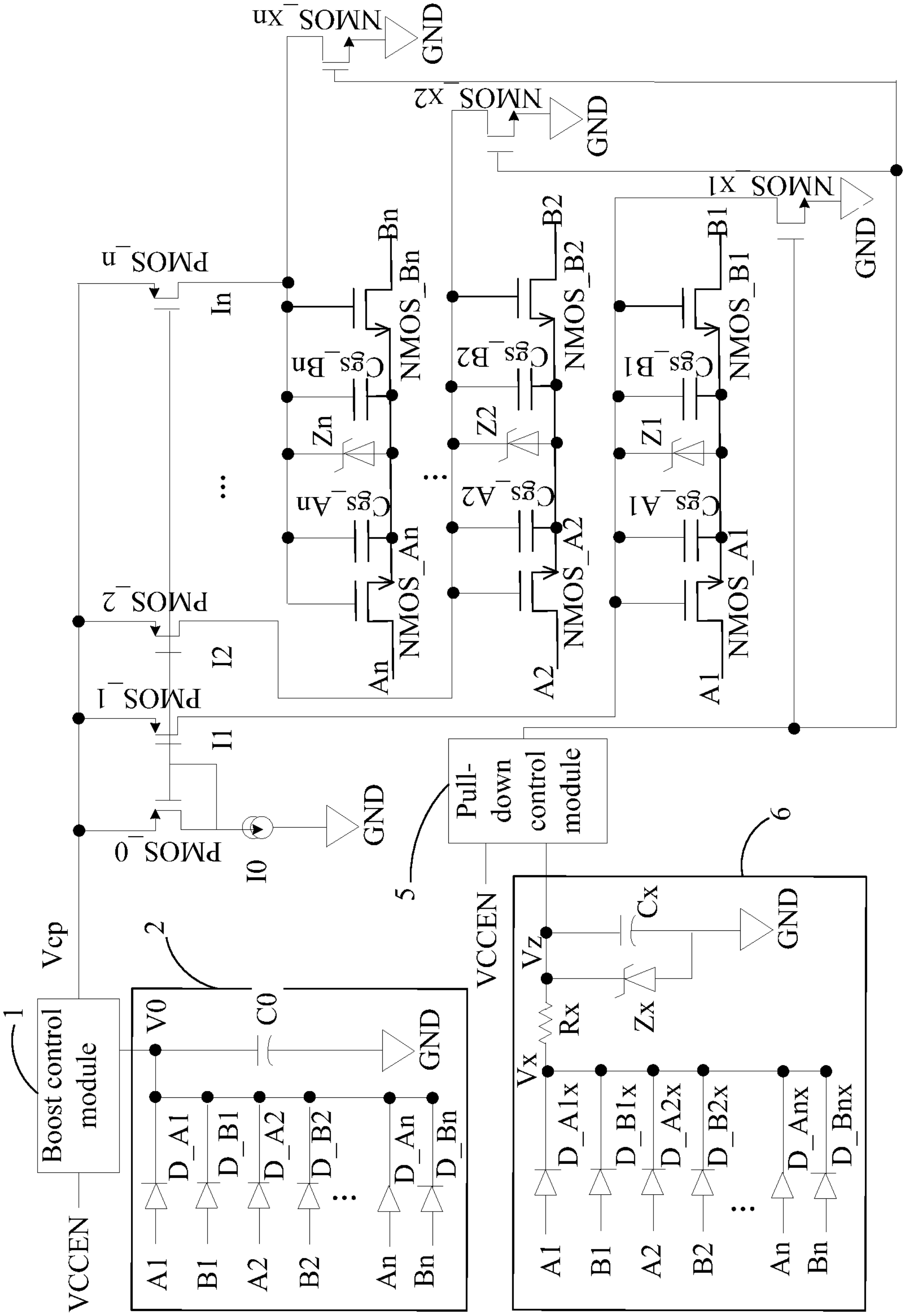
FIG. 6 is a schematic diagram VI of a structure of a signal transmission circuit according to an embodiment of the present invention.

In addition, when the path switch is an NMOS transistor, as shown in FIG. 6, the path switch can also be characterized as NMOS_A1, NMOS_A2, NMOS_An, NMOS_B1, NMOS_B2 and NMOS_Bn.

In a further example, the control terminal of the path switch is connected with a path capacitor Cgs. Furthermore, one terminal of the path capacitor Cgs can be connected to a control terminal of a path switch, and the other terminal of the path capacitor Cgs can be connected between two path switches (i.e., the path switch QA and the path switch QB). For example, when the path switch is an NMOS, the path capacitor Cgs can be connected between a source and a gate of a corresponding path switch, and thus, the charged path capacitor Cgs can provide a source-to-gate voltage that enables the path switch to turn on. When a gate-to-source voltage VGS of the NMOS transistor is greater than a voltage value, a drain and a source of the NMOS transistor can be conducted, the voltage value is a threshold voltage of the transistor, and thus, a charged voltage of the path capacitor Cgs can reach or exceed the threshold voltage.

In addition, when path switches in a signal transmission path include a path switch QA and a path switch QB, there may be corresponding path capacitors Cgs_A1, Cgs_A2 and Cgs_A3 connected to the path switch QA, and path capacitors Cgs_B1, Cgs_B2 and Cgs_B3 connected to the path switch QB.

In a further example, the signal transmission path 3 further includes a Zener diode (e.g., a Zener diode Z1, a Zener diode Z2 and a Zener diode Zn shown in FIG. 6) with an anode connected between the path switch QA and the path switch QB (i.e., a source of a path switch using an NMOS transistor), and a cathode connected to a control terminal of a path switch (i.e., a gate of a path switch using an NMOS transistor or a PMOS transistor).

The Zener diode may have a reverse breakdown voltage that can be understood as a voltage at which the voltage difference across the Zener diode remains basically stable after the reverse voltage increases to a value.

The signal transmission path mentioned above may include, for example, at least one of the following: a signal transmission path for audio signals, a signal transmission path for detection signals, a signal transmission path for control signals, and possibly a signal transmission path for any other signals.

When a charge pump for boosting several times is used instead of the boost control module in the embodiments of the present invention, the charge pump can boost a voltage of a supply voltage VCC (or an output of VCC via an internal LDO, which is not described in detail) to an output voltage of a charge pump module, and the output voltage is equal to several times the supply voltage VCC (i.e., equal to k*VCC), where k is a multiple of the value according to the specific application. For example, in some current audio signal switching applications of consumer electronics, the supply voltage VCC may be as low as 1.2 V, while the peak value of an audio signal may be as high as 16 V. Considering the deviation of the supply voltage VCC and attenuation of voltage across a resistor connected in series between a charge pump and a path switch, the value of k may be greater than 15 to allow the 16 V audio signal to pass through signal transmission paths (which may, for example, be understood as the signal transmission paths from the terminal A1 to the terminal B1, from the terminal A2 to the terminal B2, . . . , from the terminal An to the terminal Bn, as shown in FIG. 6). Moreover, after the circuit is determined, k is a fixed value. Considering that the audio signal will vary between 0 V and 16 V, the resistor between the charge pump and the path switch will have a large voltage drop when the signal amplitude is small, resulting in power loss.

It is thus learned that when the boost control module in the embodiment of the present invention is not used, a charge pump is used for boosting several times before using a resistor to reduce voltage, and finally the reduced voltage is output to a path switch. On this basis, such solution will result in larger circuit area, higher costs and higher loss.

In an embodiment of the present invention, the signal transmission circuit further includes a boost control module 1 and a first feedback module 2.

A first terminal of the boost control module 1 is connected to an input voltage which can be characterized as an input voltage VCCEN because the input voltage may be considered both as a supply voltage and an enabling signal, a second terminal of the boost control module 1 is connected to the first feedback module 2, and a third terminal of the boost control module 1 is also directly or indirectly connected to control terminals of the path switches (e.g., the path switch QA and the path switch QB). The first feedback module 2 is connected with M signal transmission terminals, where M≤2N. In an illustrated example, M=2N, and in another example, M may also be less than 2N. For example, only some of the signal transmission terminals may be selected given which voltage (s) is (are) higher and which voltage (s) is (are) lower at the signal transmission terminals.

The first feedback module 2 is configured to feed back a voltage to be superimposed (the voltage can be characterized as a voltage to be superimposed V0 as shown in FIG. 6) to the boost control module 1, and the voltage to be superimposed is adapted to the maximum voltage Vmax among voltages of the M signal transmission terminals. The "adapted to" can be understood as follows: when the maximum voltage Vmax becomes larger, the voltage to be superimposed also adaptively becomes larger, and when the maximum voltage Vmax becomes smaller, the voltage to be superimposed also adaptively becomes smaller, with the same or proportional magnitude of change. When the maximum voltage Vmax remains unchanged, the voltage to be superimposed also remains unchanged. In a further example, the difference between the voltage to be superimposed V0 and the maximum voltage Vmax may be within a certain range.

The boost control module 1 is configured to boost the input voltage VCCEN to obtain a corresponding boosted voltage VC, and output a target signal through a third terminal of the boost control module to drive the path switch into a first state by using the target signal when the input voltage VCCEN is at a high level, and a voltage VCP of the target signal is matched to the sum of the boosted voltage VC of the input voltage VCCEN and the voltage to be superimposed V0.

In addition, in some solutions, the voltage of the target signal can also be such that the path switch cannot be turned on when the input voltage VCCEN is at a low level. Therefore, it can also be understood that the target signal is used to drive the path switch directly or indirectly into a second state (e.g., an off state). It is thus learned that in some examples of the embodiments of the present invention, a pull-down control module may also not be arranged.

The boost control module 1 can use a charge pump to boost the input voltage VCCEN to the boosted voltage VC. The boosted voltage VC output after boosting can be superimposed with the voltage to be superimposed V0 by using a circuit, for example, by connecting a capacitor of an output node of the charge pump (or another capacitor that can form the boosted voltage VC) in series with the first feedback capacitor, and other solutions are not excluded. Any solution that can achieve voltage superposition can be used as an optional solution.

The first state is an on state or an off state, and if the path switch is an NMOS transistor, the first state is the on state.

The input voltage VCCEN may be voltage signals capable of forming a high level and a low level (e.g., a ground level or a GND level).

It is thus learned that in the above solution, the boost control module superimposes a voltage to be superimposed on the basis of a boosted voltage of the input voltage. Because the voltage to be superimposed is matched to the maximum voltage among voltages of the signal transmission terminals, voltages output by the boost control module can accurately and fully meet the driving requirements of the path switch when the input voltage is at a high level (for example, meet the requirements of source-drain gate threshold voltage), which avoids the need to use a charge pump for boosting several times for boosting (further, a resistor may be used to reduce voltage), thereby effectively reducing circuit area, costs and power consumption.

Specifically, compared with the solution in which voltage is boosted before using a resistor to reduce voltage, the boost control module in the present invention has a small boost factor during boost, and does require a resistor to reduce voltage, which effectively reduces power consumption, circuit area and costs.

In one of the implementations, the maximum voltage Vmax is higher than the voltage to be superimposed V0, and the difference between the maximum voltage Vmax and the voltage to be superimposed V0 is a fixed value VF, i.e., V0=Vmax-VF. On this basis, the voltage VCP of the target signal is equal to V0+VC. In another example, the voltage VCP of the target signal can also form a difference with (V0+VC).

Furthermore, the fixed value VF can be achieved based on forward voltage drop of a diode. In this case, the fixed value VF can be, for example, 0.7 V. In another example, the fixed value VF can also be achieved based on other circuits (e.g., a combination of a current source and a resistor).

Figure 2:
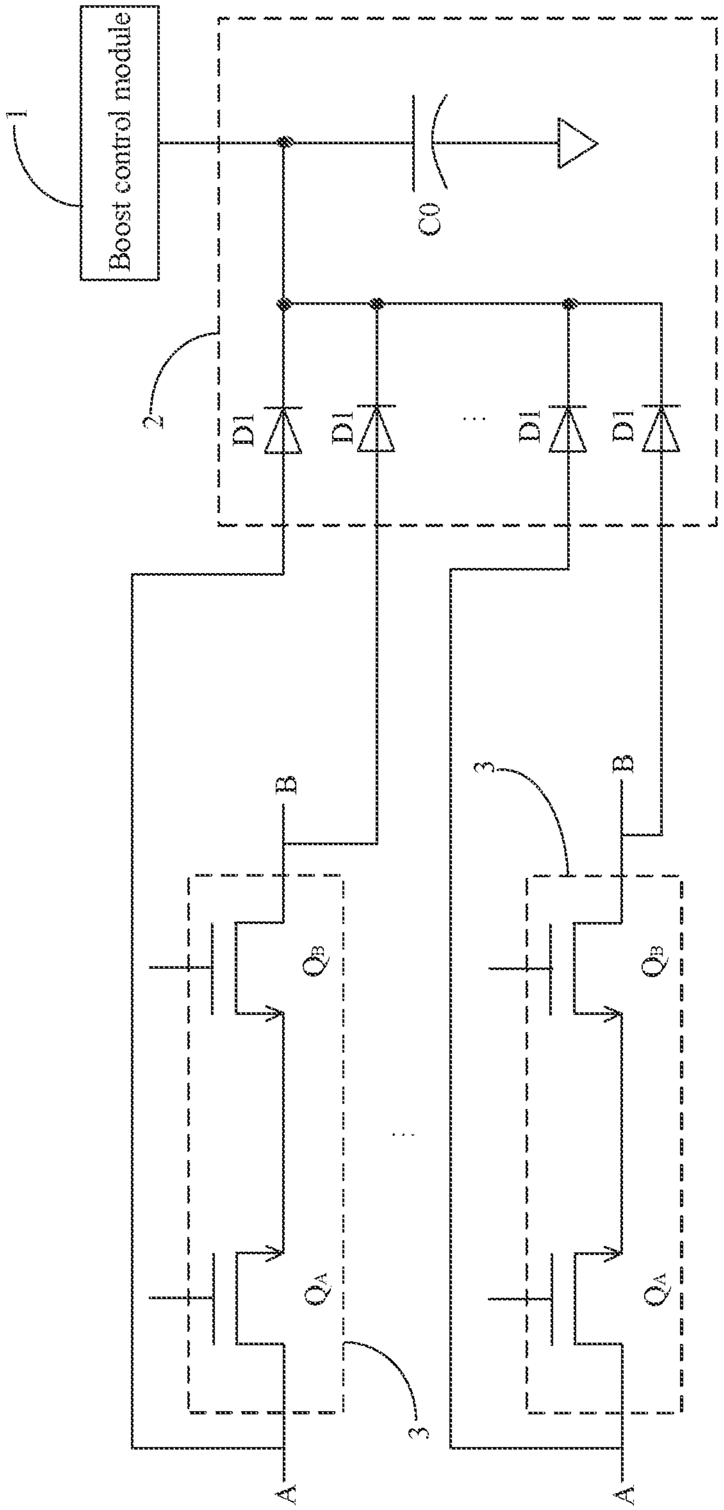
FIG. 2 is a schematic diagram II of a structure of a signal transmission circuit according to an embodiment of the present invention.

Referring to FIG. 2, the first feedback module 2 includes M first diodes D1 and a first feedback capacitor C0.

An anode of each first diode D1 is connected to a corresponding signal transmission terminal, cathodes of the M first diodes are short circuited together and then connected to a first terminal of the first feedback capacitor C0, the first terminal of the first feedback capacitor C0 is connected to the second terminal of the boost control module 1, and a second terminal of the first feedback capacitor C0 is grounded.

The first diodes D1 can also be understood as a diode D_A1 connected to a terminal A1, a diode D_A2 connected to a terminal A2, a diode D_An connected to a terminal An, a diode D_B1 connected to a terminal B1, a diode D_B2 connected to a terminal B2 and a diode D_Bn connected to a terminal Bn in the first feedback module 2 shown in FIG. 6.

In addition, the first feedback capacitor C0 can be connected directly or indirectly (e.g., through a device such as a resistor) with the first diodes and the ground.

In one of the implementations, the signal transmission circuit further includes a driver module 4. The driver module 4 enables the path switch (e.g., a path switch QA and a path switch QB) to be turned on or off.

Figure 3:
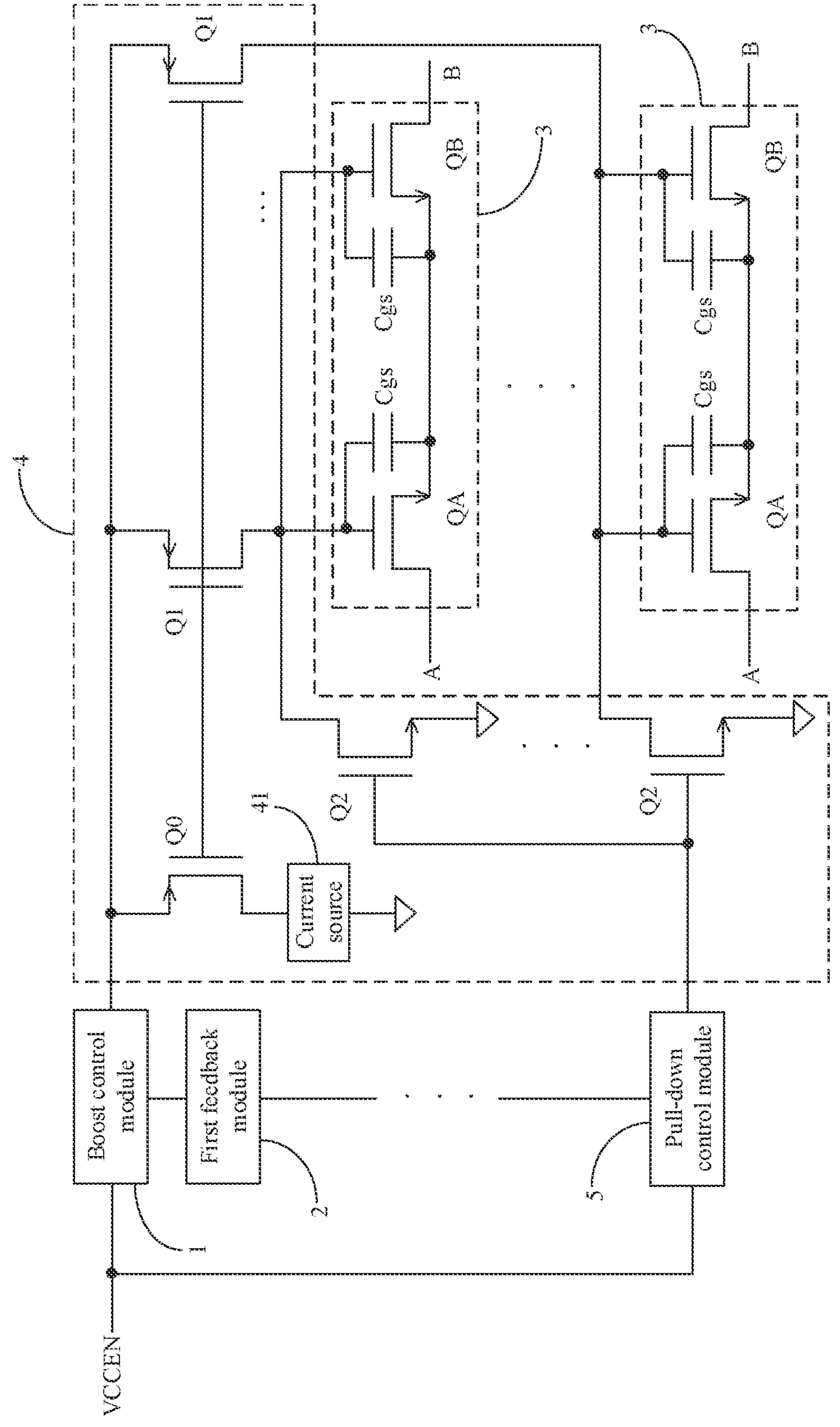
FIG. 3 is a schematic diagram III of a structure of a signal transmission circuit according to an embodiment of the present invention.
Figure 4:
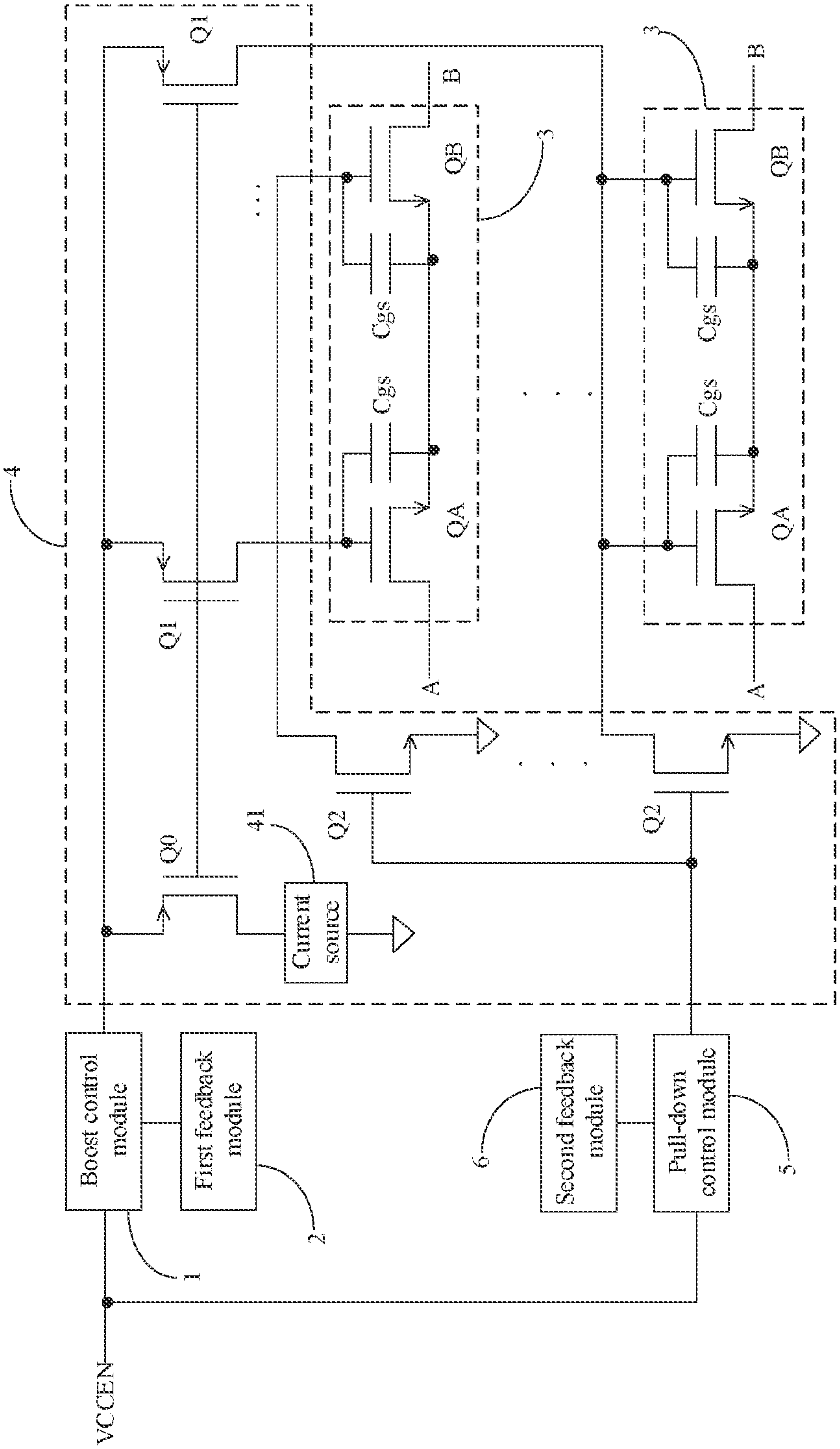
FIG. 4 is a schematic diagram IV of a structure of a signal transmission circuit according to an embodiment of the present invention.

Referring to FIG. 3 and FIG. 4, the driver module 4 includes N first drive switches Q1.

The first drive switch Q1 may be a PMOS transistor, and thus, in an example shown in FIG. 6, the first drive switch can also be characterized as PMOS_1, PMOS_2, . . . , and PMOS_n. A first terminal of the first drive switch Q1 is connected to the third terminal of the boost control module 1, and a second terminal of the first drive switch Q1 is connected to a path switch in a corresponding signal transmission path 3 (e.g., connected to a pair of path switches QA and QB respectively). In another example, the first drive switch does not exclude the use of a triode, an NMOS transistor, another transistor or another circuit device.

Each first drive switch Q1 is kept on and current is matched; when the first drive switch is turned on, the path capacitor can be charged by current (i.e., matched current) from the first drive switch, so that the path switch can be turned on after charging. The "matched" may mean the same, or may mean in a fixed proportion, or may mean within a current range.

Furthermore, referring to FIG. 3 and FIG. 4, to match current of each first drive switch, the driver module 4 further includes a current source 41 and a reference drive switch Q0. The current source 41 may also be characterized as a current source I0 shown in FIG. 6 (the current may also be characterized as I0); and the reference drive switch Q0 may be of the same type as the first drive switch Q1. In an illustrated example, both the reference drive switch Q0 and the first drive switch Q1 can be PMOS transistors.

A first terminal of the reference drive switch Q0 is connected to the third terminal of the boost control module 1, a second terminal of the reference drive switch Q0 is grounded through the current source 41, a control terminal of the reference drive switch Q0 is connected with a control terminal (e.g., a gate) of each first drive switch Q1, and current of each first drive switch Q1 is matched to current of the reference drive switch Q0.

In a further solution, the reference drive switch Q0 and each first drive switch Q1 form a pair of current mirrors. Each first drive switch Q1 and the reference drive switch Q0 may have the same size. Therefore, each path capacitor can be charged with the same current.

In other examples, switches may have different sizes, thereby forming different current, such as different signal transmission paths, and path capacitors may be charged with different current.

In one of the implementations, to bring the path switch into a second state, referring to FIG. 3 and FIG. 4, the driver module 4 further includes N second drive switches Q2; the second drive switch Q2 may be an NMOS transistor, and the possibility of using a triode, another transistor or another device is not excluded.

A first terminal of the second drive switch Q2 is connected to a control terminal of a path switch in a corresponding signal transmission path, i.e., connected to a second terminal of the first drive switch Q1, and a second terminal of the second drive switch Q2 is grounded. In addition, other circuit devices (e.g., resistors) may also be arranged between the second drive switch and the path switch, and between the second drive switch and the ground.

The second drive switch Q2 is configured to turn on when the input voltage is at a low level to drive a path switch in a corresponding signal transmission path into a second state; when the second drive switch is turned on, the path capacitor Cgs can be discharged;

where:

if the first state is an on state, the second state is an off state; and if the first state is an off state, the second state is an on state.

In a further solution, the signal transmission circuit further includes a pull-down control module 5;

a first terminal of the pull-down control module 5 is connected to the input voltage VCCEN, and a second terminal of the pull-down control module 5 is connected to a control terminal of the second drive switch Q2;

the pull-down control module 5 is configured to:

control the second drive switch Q2 to turn on when the input voltage is at a low level; or control the second drive switch Q2 to turn off when the input voltage is at a high level.

In the above solution, due to arrangement of the second drive switch and the pull-down control module, the pull-down control module can control pull-down of the second drive switch based on the input voltage, so as to effectively control the path switch when the input voltage is at a low level. Obviously, on-off control of the path switch can be achieved based on the same input voltage without inputting different control signals respectively for the circuit, and on this basis, the number of pins can be reduced, thereby further reducing circuit area and costs.

Furthermore, the second drive switch Q2 may be an NMOS transistor.

In an example shown in FIG. 6, a second drive transistor Q2 using an NMOS transistor can also be characterized as NMOS_X1, NMOS_X2, . . . , and NMOS_Xn;

a third terminal of the pull-down control module 5 is connected to a reference voltage Vz; the reference voltage Vz is adapted to the maximum voltage Vmax. The "adapted to" can be understood as follows: when the maximum voltage Vmax becomes larger, the reference voltage also adaptively becomes larger, and when the maximum voltage Vmax becomes smaller, the reference voltage also adaptively becomes smaller, with the same or proportional magnitude of change. When the maximum voltage Vmax remains unchanged, the reference voltage also remains unchanged. In a further example, the difference between the reference voltage V0 and the maximum voltage Vmax may be within a certain range.

Referring to FIG. 3, in some examples, the reference voltage Vz can be derived from the first feedback module 2. For example, a voltage Vx forming the reference voltage Vz can be formed by using a resistive divider or providing an LDO on the basis of the voltage to be superimposed V0.

Referring to FIG. 4, in some other examples, the reference voltage Vz can be derived from another second feedback module 6. For a circuit structure of the second feedback module 6, refer to the idea of the first feedback module 6, or different ideas can also be adopted.

The pull-down control module 5 is specifically configured to:

drive the second drive switch to turn on when the reference voltage Vz is in a specified operating voltage range and the input voltage is at a low level; or drive the second drive switch to turned off when the reference voltage Vz is not in the specified operating voltage range, or when the reference voltage is in the specified operating voltage range, but the input voltage is at a high level. The specified operating voltage range can be, for example, a range higher than a lower operating voltage limit. Therefore, when the reference voltage Vz is not higher than the lower operating voltage limit, it can be understood that the reference voltage is not in the specified operating voltage range; and when the reference voltage Vz is higher than the lower operating voltage limit, it can be understood that the reference voltage is in the specified operating voltage range.

In other examples, the specified operating voltage range may also have an upper operating voltage limit.

In an example, the reference voltage Vz can be, for example, supplied to an enabling terminal or a power supply terminal of the pull-down control module 5 (i.e., the third terminal of the pull-down control module is an enabling terminal or a power supply terminal). The pull-down control module 5 can work normally only when reaching the specified operating voltage range. The pull-down control module can drive the second drive switch based on a level of the input voltage during normal operation, for example, drive the second drive switch to turn off when the input voltage is at a high level, and drive the second drive switch to turn on when the input voltage is at a low level.

In some examples, when the pull-down control module 5 does not work normally, an output signal that causes the second drive switch to turn off may be kept or no signal is output, and correspondingly, the second drive switch can be configured to be controlled to turn off, and/or kept off when no signal is received at the control terminal (e.g., the gate).

In some other examples, when the pull-down control module 5 does not work normally, if the input voltage VCCEN is at a low level, the voltage VCP of the target signal output by the boost control module may not be enough to turn on the path switch. In this case, the state of the second drive switch (and a control method therefor) may not be limited to off when the pull-down control module 5 does not work normally.

Figure 5:
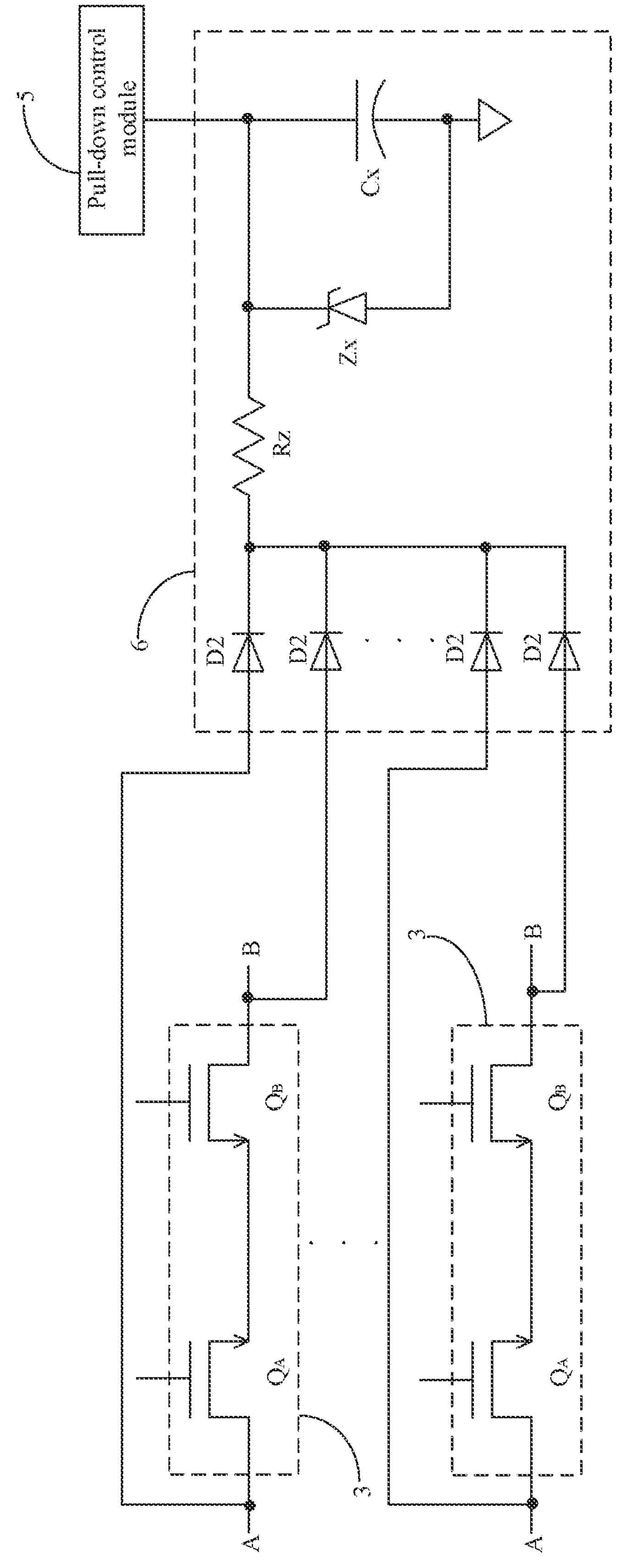
FIG. 5 is a schematic diagram V of a structure of a signal transmission circuit according to an embodiment of the present invention.

In an example shown in FIG. 5, the second feedback module 6 includes M second diodes D2 and a second feedback capacitor Cx.

An anode of each second diode D2 is connected to a corresponding signal transmission terminal, cathodes of the M second diodes are short circuited together and then connected to a first terminal of the second feedback capacitor Cx through a feedback resistor Rx, the first terminal of the second feedback capacitor Cx is connected to the third terminal of the pull-down control module 5, and a second terminal of the second feedback capacitor Cx is grounded.

The second diodes D2 can also be understood as a diode D_A1*x* connected to a terminal A1, a diode D_A2*x* connected to a terminal A2, a diode D_Anx connected to a terminal An, a diode D_B1*x* connected to a terminal B1, a diode D_B2*x* connected to a terminal B2 and a diode D_Bnx connected to a terminal Bn in the second feedback module 6 shown in FIG. 6.

The second feedback capacitor Cx can be connected directly or indirectly (e.g., through a device such as a resistor) with the second diodes and the ground.

In addition, the second feedback module may further include a Zener diode Zx, with an anode of the Zener diode Zx connected to the second terminal of the second feedback capacitor Cx, and a cathode of the Zener diode Zx connected to the first terminal of the second feedback capacitor Cx.

The working principle of a specific solution in an example of the present invention will be described below with reference to a specific circuit shown in FIG. 6:

The boost control module 1 may also use a charge pump to superimpose the boosted voltage VC of the input voltage VCCEN with the voltage to be superimposed V0, so that the voltage VCP of the target signal at the third terminal of the boost control module 1 is equal to V0+VC;

Given the maximum voltage among signal voltages at terminals A1, B1, A2, B2, . . . , An, and Bn is Vmax, then the voltage V0 obtained from a maximum input voltage selection circuit (which can be understood as the first feedback module) combining diodes D_A1, D_B1, D_A2, D_B2, D_An and D_Bn is Vmax minus forward voltage drop (i.e., a fixed voltage VF, for example, 0.7 V) of a diode, that is, V0=Vmax-VF.

Based on the circuit shown in FIG. 6, when the input voltage VCCEN is a voltage value within the normal operating voltage range of the circuit, the circuit works, and the signal transmission paths from the terminal A1 to the terminal B1, from the terminal A2 to the terminal B2, . . . , from the terminal An to the terminal Bn are turned on; and when the input voltage VCCEN is at a GND level (i.e., a ground level and a low level), the signal transmission paths from the terminal A1 to the terminal B1, from the terminal A2 to the terminal B2, . . . , from the terminal An to the terminal Bn are off.

It is thus learned that the circuit only uses one input pin (i.e., a pin connected to the input voltage VCCEN) instead of two pins in the existing solution, i.e., a pin VCC and a pin EN.

The path switch can be driven by the voltage VCP of the target signal through a current mirror circuit composed of a current source I0 (i.e., current source 41) and each first drive switch (i.e., switches identified as PMOS_0 and PMOS_1, PMOS_2, . . . , and PMOS_n). The current mirror circuit generates current I1, I2, . . . , and In to charge gates of back-to-back NMOSs of the signal transmission paths from the terminal A1 to the terminal B1, from the terminal A2 to the terminal B2, . . . , from the terminal An to the terminal Bn respectively, i.e., to charge corresponding path capacitors Cgs. When the gate-to-source voltage of the corresponding path switch (i.e., path switches identified as NMOS_A1 and NMOS_B1, NMOS_A2 and NMOS_B2, . . . , NMOS_An and NMOS_Bn) exceeds the threshold voltage, the signal transmission paths from the terminal A1 to the terminal B1, from the terminal A2 to the terminal B2, . . . , from the terminal An to the terminal Bn are effectively on. The gate-to-source voltage of each NMOS will be limited by the corresponding Zener diode, and thus, the maximum gate-to-source voltage does not exceed the reverse breakdown voltage of the corresponding Zener diode (e.g., a Zener diode Z1, a Zener diode Z2, . . . , and a Zener diode Zn) to provide a protective effect.

The voltage Vx in the second feedback module 6 can be generated in a manner similar to the voltage to be superimposed V0, and Vx can also be equal to Vmax-VF. In an example shown in FIG. 6, two independent diode-combined circuits (a combination of diodes identified as D_A1, D_B1, D_A2, D_B2, . . . , D_An and D_Bn, and a combination of diodes identified as D_A1*x*, D_B1*x*, D_A2*x*, D_B2*x*, . . . , D_Anx and D_Bnx) are used to generate a voltage to be superimposed V0 and a voltage Vx respectively. Compared with the solution in which the voltage to be superimposed V0 and the voltage Vx are short circuited together by using only one diode-combined circuit, the solution shown in FIG. 6 can ensure that the stability of the voltage to be superimposed V0 will not be affected when the second feedback capacitor Cx is charged by a circuit composed of a feedback resistor Rx behind a pin of the voltage Vx, a Zener diode Zx and a second feedback capacitor Cx or when the Zener diode Zx is broken-down.

The voltage Vx passes through a circuit composed of a feedback resistor Rx, a Zener diode Zx and a second feedback capacitor Cx to generate a reference voltage Vz, and both the reference voltage Vz and the input voltage VCCEN are input to the pull-down control module 5. When the reference voltage Vz can support normal operation of the pull-down control module 5, if a pin connected to the input voltage VCCEN is connected to a logic zero level (i.e., the input voltage is at a zero level, where the zero level can also be understood as a ground level or a low level), the pull-down control module 5 outputs a logic high level signal (with a voltage of VCCEN Invalid). When the VCCEN Invalid is higher than the gate-to-source threshold voltage of NMOS_X1, NMOS_X2, . . . , NMOS_Xn, all corresponding Cgs capacitors can be discharged, so that the signal transmission paths from the terminal A1 to the terminal B1, from the terminal A2 to the terminal B2, . . . , from the terminal An to the terminal Bn are turned off.

With the circuit shown in FIG. 6, for example, if the input voltage VCCEN is 1.5 V, the signal transmission paths from the terminal A1 to the terminal B1, from the terminal A2 to the terminal B2, . . . , from the terminal An to the terminal Bn can basically be turned on. Generally, considering better performance when the signal transmission paths are turned on, the boosted voltage VC may be about 5 V. Even so, in many applications in which voltage amplitude of signals that need to pass through is much greater than the input voltage VCCEN, a required boosted voltage VC can be achieved by simply boosting the input voltage VCCEN or a voltage output from the input voltage VCCEN through an internal LDO by a small factor (e.g., 3-4 times) to obtain an appropriate voltage VCP of the target signal. Therefore, an amplification factor of the boosted voltage VC with respect to the input voltage VCCEN may be, for example, less than 5 times (e.g., 3-4 times).

In addition, the resulting reference voltage Vz can be such that: the pull-down control module 5 can also determine and output a logic high level to turn off the signal transmission paths from the terminal A1 to the terminal B1, from the terminal A2 to the terminal B2, . . . , from the terminal An to the terminal Bn when the input voltage VCCEN is a logic zero (i.e., a ground level or a low level). Certainly, if the input voltage VCCEN is a logic zero and the reference voltage Vz is too low to allow the pull-down control module 5 to work normally, the voltage VCP of the target signal is also insufficient to turn on the signal transmission paths from the terminal A1 to the terminal B1, from the terminal A2 to the terminal B2, . . . , from the terminal An to the terminal Bn, that is, the above signal paths are ensured to be turned off.

The above working principle shows that:

1. The boost control module 1 superimposes a voltage (i.e., the boosted voltage VC) boosted by a small factor of the input voltage VCCEN on the basis of the voltage to be superimposed V0, so that VCP=V0+VC, rather than directly boosting the input operating voltage VCC by many times to a desired voltage.

2. In the above solution, two independent diode-combined maximum input voltage selection circuits (i.e., a combination of the first feedback module and the second feedback module) are included to obtain the voltage to be superimposed V0 and the voltage Vx respectively.

3. In the above solution, a pull-down control module is included to determine whether the input voltage VCCEN is valid. If the input voltage is at a low level (also can be understood as a ground level), the signal transmission paths can be turned off.

4. In the above solution, a current mirror circuit composed of a current source I0 and PMOS transistors (PMOS_0, PMOS_1, PMOS_2, . . . , PMOS_n) is included to generate currents I1, I2, . . . , and In to charge gates of back-to-back NMOSs of the signal paths from the terminal A1 to the terminal B1, from the terminal A2 to the terminal B2, . . . , from the terminal An to the terminal Bn respectively, i.e., to charge corresponding path capacitors Cgs, so as to better control the signal transmission paths to turn on.

An embodiment of the present invention further provides an electronic device, including the signal transmission circuit according to the above optional solutions.

Reference throughout the specification to "an implementation", "an embodiment", "a specific implementation process" or "an example" means that a particular feature, structure, material or characteristic described in connection with the embodiment or example is included in at least one embodiment or example of the present invention. In the specification, the schematic representations of the above terms do not necessarily refer to the same embodiment or example. Furthermore, the particular feature, structure, material or characteristic described may be combined in any suitable manner in one or more embodiments or examples.

Finally, it should be noted that the foregoing embodiments are merely intended for describing the technical solutions of the present invention rather than limiting the present invention. Although the present invention is described in detail with reference to the foregoing embodiments, those of ordinary skill in the art should understand that they may still make modifications to the technical solutions described in the foregoing embodiments or make equivalent replacements to some or all technical features thereof, without departing from the scope of the technical solutions of the embodiments of the present invention.

The invention claimed is:

1. A signal transmission circuit, comprising N signal transmission paths; each signal transmission path comprising two signal transmission terminals and a path switch connected between the two signal transmission terminals, and N≥1; wherein the signal transmission circuit further comprises a boost control module and a first feedback module;

a first terminal of the boost control module is connected to an input voltage, a second terminal of the boost control module is connected to the first feedback module, and a third terminal of the boost control module is directly or indirectly connected to a control terminal of the path switch; and the first feedback module is connected to M signal transmission terminals, wherein M≤2N;

the first feedback module is configured to feed back a voltage to be superimposed to the boost control module, and the voltage to be superimposed is adapted to the maximum voltage among voltages of the M signal transmission terminals;

the boost control module is configured to boost the input voltage and output a target signal through a third terminal of the boost control module to drive the path switch into a first state by using the target signal when the input voltage is at a high level, wherein a voltage of the target signal is matched to the sum of a boosted voltage of the input voltage and the voltage to be superimposed, and the first state is an on state or an off state;

wherein the maximum voltage is higher than the voltage to be superimposed, and the difference between the maximum voltage and the voltage to be superimposed is a fixed value;

wherein the first feedback module comprises M diodes and a feedback capacitor;

wherein an anode of each diode is connected to a corresponding signal transmission terminal, cathodes of the M diodes are short circuited together and then connected to a first terminal of the feedback capacitor, the first terminal of the feedback capacitor is connected to the second terminal of the boost control module, and a second terminal of the feedback capacitor is grounded.

2. The signal transmission circuit according to claim 1, further comprising a driver module, the driver module comprises N first drive switches; wherein a first terminal of each first drive switch is connected to the third terminal of the boost control module, a second terminal of the each first drive switch is connected to a path switch in a corresponding signal transmission path, and the each first drive switch is kept on and current is matched;

the control terminal of the path switch is connected with a path capacitor; when a first drive switch is turned on, a corresponding path capacitor can be charged by current from the first drive switch.

3. The signal transmission circuit according to claim 1, further comprising a driver module, the driver module comprises N second drive switches; wherein a first terminal of each second drive switch is connected to a control terminal of a path switch in a corresponding signal transmission path, and a second terminal of the each second drive switch is grounded;

the each second drive switch is configured to turn on when the input voltage is at a low level to drive a path switch in a corresponding signal transmission path into a second state;

if the first state is an on state, the second state is an off state; and if the first state is an off state, the second state is an on state.

4. A signal transmission circuit, comprising N signal transmission paths; each signal transmission path comprising two signal transmission terminals and a path switch connected between the two signal transmission terminals, and N≥1; wherein the signal transmission circuit further comprises a boost control module and a first feedback module;

a first terminal of the boost control module is connected to an input voltage, a second terminal of the boost control module is connected to the first feedback module, and a third terminal of the boost control module is directly or indirectly connected to a control terminal of the path switch; and the first feedback module is connected to M signal transmission terminals, wherein M≤2N;

the first feedback module is configured to feed back a voltage to be superimposed to the boost control module, and the voltage to be superimposed is adapted to the maximum voltage among voltages of the M signal transmission terminals;

the boost control module is configured to boost the input voltage and output a target signal through a third terminal of the boost control module to drive the path switch into a first state by using the target signal when the input voltage is at a high level, wherein a voltage of the target signal is matched to the sum of a boosted voltage of the input voltage and the voltage to be superimposed, and the first state is an on state or an off state;

wherein the signal transmission circuit further comprises a driver module, the driver module comprises N first drive switches;

wherein a first terminal of each first drive switch is connected to the third terminal of the boost control module, a second terminal of the each first drive switch is connected to a path switch in a corresponding signal transmission path, and the each first drive switch is kept on and current is matched;

wherein the control terminal of the path switch is connected with a path capacitor; when a first drive switch is turned on, a corresponding path capacitor can be charged by current from the first drive switch.

5. The signal transmission circuit according to claim 4, wherein the driver module further comprises a current source and a reference drive switch;

a first terminal of the reference drive switch is connected to the third terminal of the boost control module, a second terminal of the reference drive switch is grounded through the current source, a control terminal of the reference drive switch is connected with a control terminal of the each first drive switch, and current of the each first drive switch is matched to current of the reference drive switch.

6. A signal transmission circuit, comprising N signal transmission paths; each signal transmission path comprising two signal transmission terminals and a path switch connected between the two signal transmission terminals, and N≥1; wherein the signal transmission circuit further comprises a boost control module and a first feedback module;

a first terminal of the boost control module is connected to an input voltage, a second terminal of the boost control module is connected to the first feedback module, and a third terminal of the boost control module is directly or indirectly connected to a control terminal of the path switch; and the first feedback module is connected to M signal transmission terminals, wherein M≤2N;

the first feedback module is configured to feed back a voltage to be superimposed to the boost control module, and the voltage to be superimposed is adapted to the maximum voltage among voltages of the M signal transmission terminals;

the boost control module is configured to boost the input voltage and output a target signal through a third terminal of the boost control module to drive the path switch into a first state by using the target signal when the input voltage is at a high level, wherein a voltage of the target signal is matched to the sum of a boosted voltage of the input voltage and the voltage to be superimposed, and the first state is an on state or an off state;

wherein the signal transmission circuit, further comprises a driver module, the driver module comprises N second drive switches;

wherein a first terminal of each second drive switch is connected to a control terminal of a path switch in a corresponding signal transmission path, and a second terminal of the each second drive switch is grounded;

wherein the each second drive switch is configured to turn on when the input voltage is at a low level to drive a path switch in a corresponding signal transmission path into a second state;

wherein if the first state is an on state, the second state is an off state; and wherein if the first state is an off state, the second state is an on state.

7. The signal transmission circuit according to claim 6, further comprising a pull-down control module; wherein a first terminal of the pull-down control module is connected to the input voltage, and a second terminal of the pull-down control module is connected to a control terminal of the each second drive switch;

the pull-down control module is configured to:

control the each second drive switch to turn on when the input voltage is at a low level.

8. The signal transmission circuit according to claim 7, wherein a third terminal of the pull-down control module is connected to a reference voltage; the reference voltage is adapted to the maximum voltage, and the reference voltage is derived from the first feedback module or another second feedback module;

the pull-down control module is specifically configured to:

drive the each second drive switch to turn on when the reference voltage is in a specified operating voltage range and the input voltage is at a low level.

9. The signal transmission circuit according to claim 8, wherein the reference voltage is lower than the voltage to be superimposed and also lower than the maximum voltage.

10. A signal transmission circuit, comprising N signal transmission paths; each signal transmission path comprising two signal transmission terminals and a path switch connected between the two signal transmission terminals, and N≥1; wherein the signal transmission circuit further comprises a boost control module and a first feedback module;

a first terminal of the boost control module is connected to an input voltage, a second terminal of the boost control module is connected to the first feedback module, and a third terminal of the boost control module is directly or indirectly connected to a control terminal of the path switch; and the first feedback module is connected to M signal transmission terminals, wherein M≤2N;

the first feedback module is configured to feed back a voltage to be superimposed to the boost control module, and the voltage to be superimposed is adapted to the maximum voltage among voltages of the M signal transmission terminals;

the boost control module is configured to boost the input voltage and output a target signal through a third terminal of the boost control module to drive the path switch into a first state by using the target signal when the input voltage is at a high level, wherein a voltage of the target signal is matched to the sum of a boosted voltage of the input voltage and the voltage to be superimposed, and the first state is an on state or an off state;

wherein the maximum voltage is higher than the voltage to be superimposed, and the difference between the maximum voltage and the voltage to be superimposed is a fixed value;

wherein the signal transmission circuit, further comprises a driver module, the driver module comprises N first drive switches;

wherein a first terminal of each first drive switch is connected to the third terminal of the boost control module, a second terminal of the each first drive switch is connected to a path switch in a corresponding signal transmission path, and the each first drive switch is kept on and current is matched;

wherein the control terminal of the path switch is connected with a path capacitor; when a first drive switch is turned on, a corresponding path capacitor can be charged by current from the first drive switch.

11. A signal transmission circuit, comprising N signal transmission paths; each signal transmission path comprising two signal transmission terminals and a path switch connected between the two signal transmission terminals, and N≥1; wherein the signal transmission circuit further comprises a boost control module and a first feedback module;

a first terminal of the boost control module is connected to an input voltage, a second terminal of the boost control module is connected to the first feedback module, and a third terminal of the boost control module is directly or indirectly connected to a control terminal of the path switch; and the first feedback module is connected to M signal transmission terminals, wherein M≤2N;

the first feedback module is configured to feed back a voltage to be superimposed to the boost control module, and the voltage to be superimposed is adapted to the maximum voltage among voltages of the M signal transmission terminals;

the boost control module is configured to boost the input voltage and output a target signal through a third terminal of the boost control module to drive the path switch into a first state by using the target signal when the input voltage is at a high level, wherein a voltage of the target signal is matched to the sum of a boosted voltage of the input voltage and the voltage to be superimposed, and the first state is an on state or an off state;

wherein the maximum voltage is higher than the voltage to be superimposed, and the difference between the maximum voltage and the voltage to be superimposed is a fixed value;

wherein the signal transmission circuit further comprises a driver module, the driver module comprises N second drive switches;

Wherein a first terminal of each second drive switch is connected to a control terminal of a path switch in a corresponding signal transmission path, and a second terminal of the each second drive switch is grounded;

wherein the each second drive switch is configured to turn on when the input voltage is at a low level to drive a path switch in a corresponding signal transmission path into a second state;

wherein if the first state is an on state, the second state is an off state; and wherein if the first state is an off state, the second state is an on state.

12. An electronic device, comprising a signal transmission circuit, wherein the signal transmission circuit comprises N signal transmission paths; each signal transmission path comprising two signal transmission terminals and a path switch connected between the two signal transmission terminals, and N≥1;

wherein the signal transmission circuit further comprises a boost control module and a first feedback module;

wherein a first terminal of the boost control module is connected to an input voltage, a second terminal of the boost control module is connected to the first feedback module, and a third terminal of the boost control module is directly or indirectly connected to a control terminal of the path switch; and the first feedback module is connected to M signal transmission terminals, wherein M≤2N;

wherein the first feedback module is configured to feed back a voltage to be superimposed to the boost control module, and the voltage to be superimposed is adapted to the maximum voltage among voltages of the M signal transmission terminals;

wherein the boost control module is configured to boost the input voltage and output a target signal through a third terminal of the boost control module to drive the path switch into a first state by using the target signal when the input voltage is at a high level, wherein a voltage of the target signal is matched to the sum of a boosted voltage of the input voltage and the voltage to be superimposed, and the first state is an on state or an off state;

wherein the maximum voltage is higher than the voltage to be superimposed, and the difference between the maximum voltage and the voltage to be superimposed is a fixed value;

wherein the first feedback module comprises M diodes and a feedback capacitor;

wherein an anode of each diode is connected to a corresponding signal transmission terminal, cathodes of the M diodes are short circuited together and then connected to a first terminal of the feedback capacitor, the first terminal of the feedback capacitor is connected to the second terminal of the boost control module, and a second terminal of the feedback capacitor is grounded.

13. An electronic device, comprising a signal transmission circuit, wherein the signal transmission circuit comprises N signal transmission paths; each signal transmission path comprising two signal transmission terminals and a path switch connected between the two signal transmission terminals, and N≥1;

wherein the signal transmission circuit further comprises a boost control module and a first feedback module;

wherein a first terminal of the boost control module is connected to an input voltage, a second terminal of the boost control module is connected to the first feedback module, and a third terminal of the boost control module is directly or indirectly connected to a control terminal of the path switch; and the first feedback module is connected to M signal transmission terminals, wherein M≤2N;

wherein the first feedback module is configured to feed back a voltage to be superimposed to the boost control module, and the voltage to be superimposed is adapted to the maximum voltage among voltages of the M signal transmission terminals;

wherein the boost control module is configured to boost the input voltage and output a target signal through a third terminal of the boost control module to drive the path switch into a first state by using the target signal when the input voltage is at a high level, wherein a voltage of the target signal is matched to the sum of a boosted voltage of the input voltage and the voltage to be superimposed, and the first state is an on state or an off state;

wherein the electronic device further comprises a driver module, the driver module comprises N first drive switches;

wherein a first terminal of each first drive switch is connected to the third terminal of the boost control module, a second terminal of the each first drive switch is connected to a path switch in a corresponding signal transmission path, and the each first drive switch is kept on and current is matched;

wherein the control terminal of the path switch is connected with a path capacitor; when a first drive switch is turned on, a corresponding path capacitor can be charged by current from the first drive switch.

14. The electronic device according to claim 13, wherein the driver module further comprises a current source and a reference drive switch;

a first terminal of the reference drive switch is connected to the third terminal of the boost control module, a second terminal of the reference drive switch is grounded through the current source, a control terminal of the reference drive switch is connected with a control terminal of the each first drive switch, and current of the each first drive switch is matched to current of the reference drive switch.

15. An electronic device, comprising a signal transmission circuit, wherein the signal transmission circuit comprises N signal transmission paths; each signal transmission path comprising two signal transmission terminals and a path switch connected between the two signal transmission terminals, and N≥1;

wherein the signal transmission circuit further comprises a boost control module and a first feedback module;

wherein a first terminal of the boost control module is connected to an input voltage, a second terminal of the boost control module is connected to the first feedback module, and a third terminal of the boost control module is directly or indirectly connected to a control terminal of the path switch; and the first feedback module is connected to M signal transmission terminals, wherein M≤2N;

wherein the first feedback module is configured to feed back a voltage to be superimposed to the boost control module, and the voltage to be superimposed is adapted to the maximum voltage among voltages of the M signal transmission terminals;

wherein the boost control module is configured to boost the input voltage and output a target signal through a third terminal of the boost control module to drive the path switch into a first state by using the target signal when the input voltage is at a high level, wherein a voltage of the target signal is matched to the sum of a boosted voltage of the input voltage and the voltage to be superimposed, and the first state is an on state or an off state;

wherein the electronic device further comprises a driver module, the driver module comprises N second drive switches;

wherein a first terminal of each second drive switch is connected to a control terminal of a path switch in a corresponding signal transmission path, and a second terminal of the each second drive switch is grounded;

wherein the each second drive switch is configured to turn on when the input voltage is at a low level to drive a path switch in a corresponding signal transmission path into a second state;

wherein if the first state is an on state, the second state is an off state; and wherein if the first state is an off state, the second state is an on state.

16. The electronic device according to claim 15, further comprising a pull-down control module; wherein a first terminal of the pull-down control module is connected to the input voltage, and a second terminal of the pull-down control module is connected to a control terminal of the each second drive switch;

the pull-down control module is configured to:

control the each second drive switch to turn on when the input voltage is at a low level.

* * * * *